United States Patent
Babb et al.

(10) Patent No.: US 8,060,968 B2
(45) Date of Patent: Nov. 22, 2011

(54) VARIABLE BELT TENSIONER FOR DRAIN CLEANING DEVICES

(75) Inventors: Larry F. Babb, Grafton, OH (US); Michael J. Rutkowski, Brunswick, OH (US)

(73) Assignee: Emerson Electric Co., St. Louis, MO (US)

( * ) Notice: Subject to any disclaimer, the term of this patent is extended or adjusted under 35 U.S.C. 154(b) by 755 days.

(21) Appl. No.: 12/200,404

(22) Filed: Aug. 28, 2008

(65) Prior Publication Data
US 2010/0050350 A1    Mar. 4, 2010

(51) Int. Cl.
  *B08B 9/02* (2006.01)
  *B08B 7/00* (2006.01)
  *B08B 1/00* (2006.01)
(52) U.S. Cl. ..................... 15/104.33; 474/135
(58) Field of Classification Search ............... 15/104.33, 15/104.31, 104.09, 104.095; 254/134.3 FT; 474/101, 109, 111, 112, 113, 117, 133, 135; B08B 9/02
See application file for complete search history.

(56) References Cited

U.S. PATENT DOCUMENTS

| | | | |
|---|---|---|---|
| 855,237 A * | 5/1907 | Dunn | 474/135 |
| 1,657,824 A | 1/1928 | Gallimore | |
| 1,695,759 A | 12/1928 | Conradson | |
| 1,744,746 A * | 1/1930 | Brown | 474/135 |
| 2,366,368 A | 1/1945 | Sundstrand et al. | |
| 2,770,894 A | 11/1956 | Gettleman | |
| 3,246,354 A | 4/1966 | Cooney et al. | |
| 5,769,747 A * | 6/1998 | Kuhn et al. | 474/135 |
| 6,364,044 B1 * | 4/2002 | Juan | 180/206.2 |
| 6,381,798 B1 | 5/2002 | Rutkowski et al. | |
| 7,178,534 B2 * | 2/2007 | Garman et al. | 134/167 C |
| 7,222,383 B2 | 5/2007 | Hale | |

FOREIGN PATENT DOCUMENTS
EP   1375763    1/2004

* cited by examiner

*Primary Examiner* — Joseph J Hail
*Assistant Examiner* — Tyrone Hall, Jr.
(74) *Attorney, Agent, or Firm* — Rankin, Hill & Clark LLP

(57) ABSTRACT

An assembly for adjusting belt tension in a drain cleaning device is disclosed. The assembly includes an idler pulley assembly in which a pivotable idler pulley is urged against a belt by a tensioned spring. The tensile force exerted by the spring can be adjusted or otherwise changed by a rotatable spool engaged to the other end of the spring.

20 Claims, 4 Drawing Sheets

VARIABLE BELT TENSIONER FOR DRAIN CLEANING DEVICES

FIELD OF THE INVENTION

The presently disclosed embodiments are directed to the field of drain cleaning devices, and particularly belt tensioning assemblies used in such devices.

BACKGROUND

Drain cleaning devices typically utilize an electric motor that rotates a drum which houses a drain cleaning cable or "snake" as known in the art. A belt is typically used between the motor and drum. As will be appreciated by those skilled in the art, as the drum is rotated, the drain cleaning cable is either advanced or retracted, and rotated about its longitudinal axis. Frequently, it is necessary to adjust the tension of the belt that rotates the drum and administers the drain cleaning cable. A wide assortment of belt tensioning assemblies are known in the art and used in drain cleaning devices. One function of such belt tensioning assemblies is to maintain an effective level of tension on the belt so that the belt does not slip against the drum, and therefore so that the drum is efficiently rotated. However, it is also important that slippage be allowed to occur in the event that the drain cleaning cable abruptly stops or becomes bound, or if rotation of the drum is suddenly precluded.

During operation of a drain cleaning device, it is important that a particular amount of torque is transmitted to the drum and hence to the drain cleaning cable, by the motor and belt. If the level of torque is excessive, the cable will frequently bend and/or buckle in the drum which is undesirable. If the level of torque is too low, the drain cleaning cable will not effectively dislodge or disrupt blockages typically encountered in a drain cleaning operation. And so, another function of many belt tensioning assemblies used in drain cleaning devices is to achieve a particular amount of torque in the rotating drain cleaning cable.

FIGS. 1 and 2 illustrate a typical belt tensioning assembly 10 used in a prior art drain cleaning apparatus 2. The drain cleaning apparatus 2 comprises, in part, a motor 40 that rotates a drive pulley 42, which in turn drives a belt 50. The assembly 10 utilizes an idler pulley assembly 20 that includes a pulley 22 rotatably mounted on an arm 26 by an axle 24. The arm 26 is pivotable about a base 30. Referring to FIG. 1, the assembly 10 also utilizes a tensioning spring 60 affixed to a frame or other stationary member of the drain cleaning apparatus 2 by a spring base 62. As will be understood, the spring 60 urges the pulley 22 against the belt 50.

Operators typically adjust the tension of the belt 50 by trial and error in selecting different springs, such as spring 60. Typically, the tension exerted upon the idler pulley 22 and thus upon the belt 50, can be changed by selecting a spring having a different length and/or a different spring constant. FIGS. 1 and 2 illustrate two different springs 60 and 60', respectively, used to urge the idler pulley 22 against the belt 50. Operators in the field typically keep a variety of replacement parts including an assortment of springs. And so, in deciding to adjust the belt tension in the apparatus of FIG. 1 for example, an operator must stop the drain cleaning device, remove the spring 60 by disengaging it from the idler pulley assembly 20, remove or loosen the spring base 62, select a new spring, attach the new spring to the idler pulley assembly and the spring base, and then restart the drain cleaning device. After this series of operations, the operator must then determine whether the newly selected spring is imparting the proper amount of tension so as to achieve the desired amount of torque at the drain cleaning cable.

If the operator determines that the newly selected spring is still not resulting in the proper level of torque for the drain cleaning cable, this process must be repeated, i.e. the drain cleaning apparatus stopped, previous spring removed and replaced with a different spring, and then the device restarted. Often several cycles of this process must be undertaken before an operator achieves a desired level of torque at the drain cleaning cable. Understandably, this process is tedious and time consuming.

Another technique used by operators to adjust belt tension is to change the position of the spring base 62. Referring further to FIGS. 1 and 2, it will be understood that the tension of springs 60 and 60' in FIGS. 1 and 2 can be reduced by moving the spring base 62 from position B to position A on a frame support member thereby reducing the length of the tensioned spring. And, referring to FIG. 2, it will be understood that the tension of spring 60' can be increased by moving the spring base from position B to position C thereby increasing the length of the tensioned spring.

Although changing the linear position of the spring base from one location to another is less cumbersome and tedious than replacing the entire spring, the technique is limited. First, it is still undesirable to completely disengage an end of the spring from attachment to a stationary member. Such disengagement results in a near entire loss of force application to the belt by the idler pulley. Furthermore, the linear span or range within which the spring base can be moved is typically limited by the exposed area available on the frame support member. Moreover, additional holes must be drilled in the frame member in order to obtain different end positions for the spring, and thus achieve different torque levels. Furthermore, as the spring end is repositioned, the angle at which the spring applies force to the idler pulley changes, thereby further complicating the estimation by the operator of a suitable position for the spring end.

Accordingly, in view of these and other disadvantages, a need exists for an assembly and related technique by which belt tension in a drain cleaning device can be readily adjusted. In addition, it would be particularly desirable if such adjustment could be made concurrently while operating the drain cleaning device.

SUMMARY OF THE INVENTION

The difficulties and drawbacks associated with previous-type systems are overcome in the present apparatus for a drain cleaning device comprising a particular belt tensioning assembly.

In one aspect, the present invention provides a drain cleaning device comprising a frame and a motor and drive pulley. The motor is secured to the frame and adapted for poweredly rotating the drive pulley about a first axis. The device also comprises a rotatable drum rotatably secured to the frame. The drum is rotatable about a second axis generally parallel to the first axis. The drum is adapted to receive and administer a drain cleaning cable. The device also comprises a belt extending between the drive pulley and the drum for rotating the drum upon rotation of the drive pulley. The device further comprises an idler pulley assembly including a support arm and a positionable idler pulley affixed to the support arm and in contact with the belt. The support arm is engaged with the frame. And, the device comprises a belt tensioning assembly including a spool engaged with the frame. The spool is rotatable about a center axle. The belt tensioning assembly also includes a biasing member having a first end affixed to the spool and a second end affixed to the support arm of the idler pulley assembly. The tension of the belt can be changed by rotating the spool about the axle and displacing the first end of the biasing member through an arc also about the axle, such that the effective length of the biasing member is changed thereby resulting in the force applied to the support arm by the biasing member also being changed.

In another aspect, the present invention provides a drain cleaning device comprising a frame and a motor and drive pulley. The motor is secured to the frame and adapted for poweredly rotating the drive pulley. The device also comprises a rotatable drum rotatably secured to the frame. The drum is adapted to receive and administer a drain cleaning cable. The device further comprises a belt extending between the drive pulley and the drum for rotating the drum upon rotation of the drive pulley. The device also comprises an idler pulley assembly including a positionable support arm and an idler pulley rotatably attached to the support arm and in positionable contact with the belt. The support arm is engaged with the frame. The device further comprises a belt tensioning assembly including (i) a spool rotatably mounted to the frame, the spool including a centrally disposed hub, and (ii) an elongate biasing member having a first end affixed to the spool, a second end affixed to the support arm of the idler pulley assembly, and an intermediate region defined between the first and second ends. Upon rotating the spool, at least a portion of the intermediate region of the biasing member contacts the hub of the spool.

In yet another aspect, the present invention provides a drain cleaning device comprising a frame and a motor and drive pulley. The motor is secured to the frame and adapted for poweredly rotating the drive pulley. The device also comprises a rotatable drum rotatably secured to the frame. The drum is adapted to receive and administer a drain cleaning cable. The device also comprises a belt extending between the drive pulley and the drum for rotating the drum upon rotation of the drive pulley. The device also comprises an idler pulley assembly including a support arm and a positionable idler pulley rotatably attached to the support arm and in positionable contact with the belt. The support arm is engaged with the frame. The device further comprises an assembly for adjusting the tension of the belt applied by the idler pulley. The assembly comprises (i) a rotatable spool including a cylindrical hub extending between a pair of end walls, the spool defining a passage extending through the hub and the pair of end walls, the spool movably engaged to the frame by an axle member, and (ii) an elongate biasing member having a first end, a second end, and an intermediate portion extending between the first and the second ends, the first end being affixed to one of the end walls of the spool, the second end being affixed to the support arm of the idler pulley assembly, and the elongate biasing member exerting a tension force on the support arm.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

The present invention provides an assembly for easily and conveniently adjusting the tension of a drum drive belt in a drain cleaning device. The assembly can be readily incorporated into a wide array of drain cleaning devices, is relatively inexpensive, and enables an operator to quickly and conveniently adjust belt tension. Furthermore, the assembly is relatively compact and does not occupy an excessive amount of space along a face of a drain cleaning device. Generally, the present invention assemblies comprise a biasing member that is attached between an idler pulley assembly and a rotatable spool which is releasably affixed to a stationary frame member of the device. The spool is releasably affixed to the frame member such that upon loosening or otherwise disengaging one or more locking members, the spool can be rotated so that a portion of the biasing member is wound about the spool to thereby decrease the effective length of the biasing member thus resulting in greater tensile force applied to the idler pulley assembly and belt. Upon attaining a desired tension in the belt, the rotational position of the spool is locked or otherwise retained by tightening or otherwise engaging the locking member(s). The term "effective length" refers to the length of a portion of the biasing member that is available for elastic deformation. By rotating the spool in a first direction such that a portion of the total length of the biasing member is wound about the spool and thus not available for elastic deformation, the effective length of the biasing member is reduced. Conversely, by rotating the spool in a second direction opposite from the first direction, the total length of the biasing member available for elastic deformation is increased.

Figure 1:
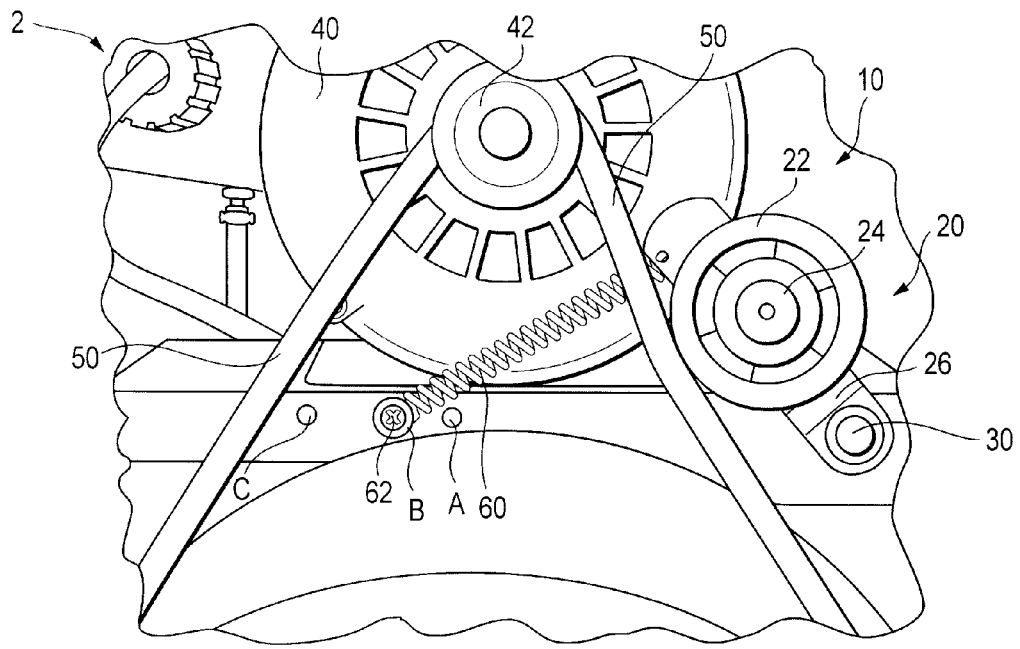
FIGS. 1 and 2 are illustrations of a prior art belt tensioning assembly used in a drain cleaning apparatus.
Figure 2:
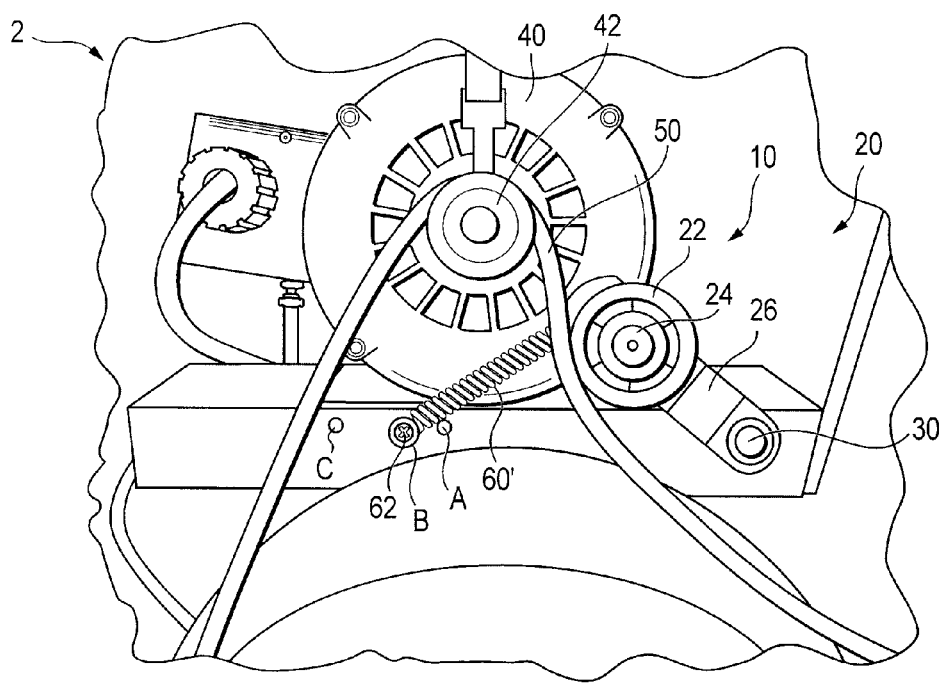
Figure 3:
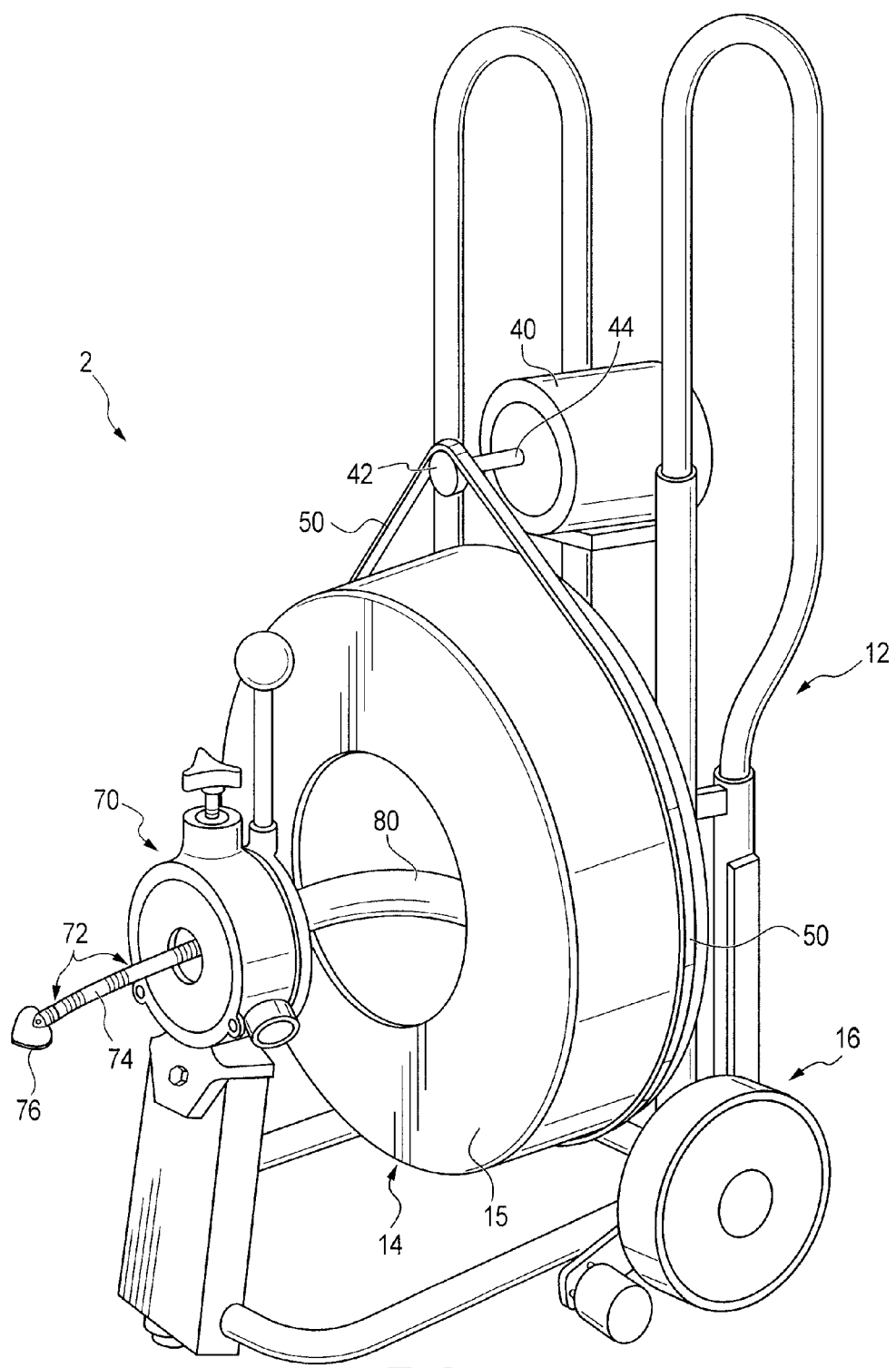
FIG. 3 is an illustration of a typical drain cleaning apparatus.

With reference now to the drawings where the showings are for purposes of illustrating the preferred embodiments of the invention only and not for purposes of limiting same, a portable sewer or drain cleaning machine 2 is shown in FIG. 3 as comprising a wheeled frame assembly 12 supporting a rotatable snake drum unit 14, and a snake feeding mechanism 70. The frame assembly 12 is provided with a pair of wheels 16 by which the machine 2 is adapted to be supported for rolling movement from one location to another along an underlying surface. The drum unit 14 contains a flexible drain cleaning tool 72 in the form of a snake 74 carrying a cutting tool 76 on the distal end thereof. Both the cable 74 and the cutting tool 76 may be referred to as a snake. In the embodiment shown, the proximal end of the snake is stored in a coiled arrangement within the rotatable drum unit 14.

The drive unit 70 of the sewer cleaning machine 2 includes an electric drive motor 40 which is adapted to drive an endless belt 50 which engages about the outer periphery of a drum housing 15 of the drum unit 14. Further in this respect, the motor 40 has a drive shaft 44 rotatable about a drive shaft axis and provided with a drive pulley 42 about which the belt 50 is trained. The belt is driven in response to rotation of the shaft 44 to rotate the drum housing 15. In certain embodiments, the pulley 42 and the portion of the belt 50 exposed above the drum housing 15 are covered or partially covered for protective purposes by a suitable guard (not shown).

As is well known, the drum housing 15 contains the coiled spring wire plumbers snake 74, and a guide tube 80 serves to guide displacement of the snake into and out of the housing 15 during use of the machine in a manner which provides for the snake to be coiled and uncoiled during its displacement relative to the housing. While the guide tube 80 is illustrated and described herein as being a part of the drum unit, this is merely a possible arrangement of the tube and the tube could be supported adjacent its axially outer end for rotation, in which case it could be free of a mounted interconnection with the drum unit. Further the drum housing and hub could be provided as integral or separate components. Additionally, the particular cleaning apparatus 2 of FIG. 3 is not critical for the drain cleaning cable or snake which can be used, in various sizes and configurations and styles and in any other form of cleaning apparatus such as, for example drum machines such as the K-380, K-750, K-3800, K-6200, K-7500, K-375R, and K-750R Series, all of which are sold by Ridge Tool Company and others as well.

The present invention relates to a belt tensioner assembly for a drain cleaning device such as shown in FIG. 3. The belt tensioner assembly serves to enable an operator to selectively adjust the torque applied to the rotating snake. If for example, an excessive amount of torque is applied to the snake, such as for example more than about 150 inch-pounds, the cable will often begin to flip and buckle in the drum which is undesirable. The present invention belt tensioner enables an operator to readily achieve a desired torque which is applied to the snake, typically from about 105 to 145 inch-pounds. If an insufficient amount of torque is applied to the snake, such as less than about 100 inch-pounds, the cable will often fail to effectively dislodge or otherwise destroy blockages in a drain undergoing cleaning. Using the preferred embodiment belt tensioning assemblies, an operator can easily adjust and specifically increase or decrease, the torque of the snake. It will be appreciated that these values and ranges are merely exemplary in nature. The particular torque applied to a cable depends upon a host of factors.

The preferred embodiment tensioner assembly preferably comprises a rotatable spool having an anchor located on its periphery, a positionable idler pulley in contact with a belt to be tensioned, and a biasing member such as a coil spring extending between the spool and the pulley. One end of the biasing member, which for example may be a coil spring, is attached to the anchor. As the spool is rotated about a center axle, the anchor is displaced through an arc about the axle thereby increasing (or decreasing) the effective length of the spring and thus the tension of the spring. The spring then applies an increased (or decreased) force upon the idler pulley thereby tightening (or loosening) the belt and increasing (or decreasing) the level of torque transmitted to the snake from the belt being driven by a motor. By appropriate rotational positioning of the spool, a particular desired tension can be applied to the coil spring which in turn governs the amount of torque ultimately exhibited by the snake.

Figure 4:
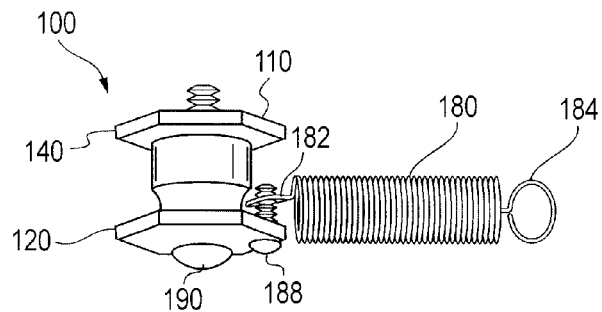
FIG. 4 is a perspective view of a preferred embodiment variable belt tensioner assembly in accordance with the present invention.

FIG. 4 illustrates a preferred embodiment belt tensioning assembly 100 in accordance with the present invention. The assembly 100 comprises a spool 110, a biasing member such as a spring 180 having first and second ends 182 and 184 respectively, an attachment member 188 releasably engaging the spring end 182 to the spool 110, and an axle 190 for rotatably supporting the spool 110. The biasing member, which in this embodiment is in the form of a spring, is preferably elongate meaning that its length is greater than any of its other dimensions. Moreover, an intermediate region is generally defined between the two ends of the biasing member, such as first and second ends 182 and 184. When the biasing member is in the form of a tension spring, the intermediate region is denoted herein as an extension member.

As noted, upon incorporation in a drain cleaning device, and particularly, upon affixing the spool 110 to a frame member or other sturdy stationary component of the device, the spool if desired, can be selectively rotated. Upon attaining a desired rotational position of the spool, the spool can be locked or otherwise secured in that desired position. The present invention includes a wide range of techniques and assemblies for accomplishing this. FIG. 4 illustrates one such approach in which the axle 190 is in the form of a threaded member that extends through an aperture or bore defined in the spool, and which is threadedly engaged with the frame member of the drain cleaning device. Upon loosening the threaded member from its engagement with the frame member, the spool can be selectively rotated to a desired position. The threaded member can then be tightened, frictionally engaged, or otherwise engaged with the frame member, thereby engaging the spool. It may also be desirable to utilize a locking member such as a lock washer disposed between the spool and a head or other portion of the threaded member. It will be appreciated that the present invention includes a wide array of other assemblies and strategies for releasably affixing the spool in a desired rotational position upon its engagement with an underlying frame member.

Figure 5:
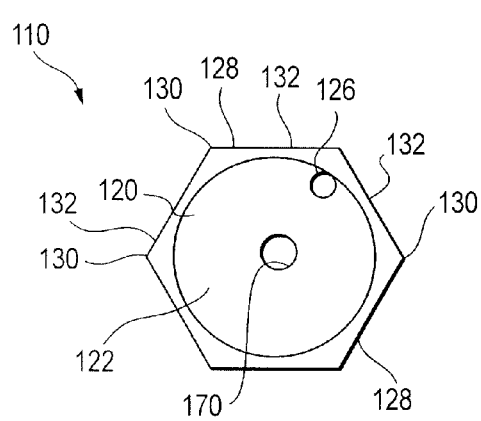
FIG. 5 is an end view of a preferred spool used in the preferred embodiment assembly of the present invention.
Figure 6:
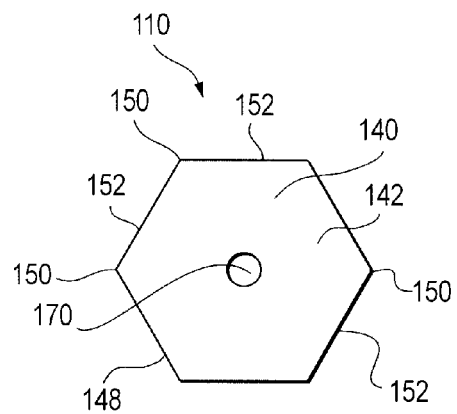
FIG. 6 is a view of another end of the preferred spool.
Figure 7:
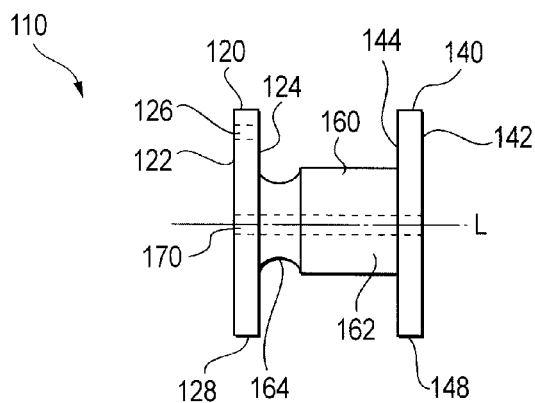
FIG. 7 is a side view of the preferred spool.

FIGS. 5-7 illustrate additional aspects of the preferred spool 110 used in the preferred embodiment assembly 100. The spool includes a first end wall 120, a second end wall 140, and a hub 160 extending between the first and second end walls 120 and 140. The first end wall 120 defines an outer face 122 and an oppositely directed inner face 124. The end wall 120 also preferably defines an aperture 126 extending through the end wall 120 between the faces 122 and 124. Defined along the outer perimeter or periphery of the end wall 120 and between the faces 122 and 124 is an edge 128. In the preferred spool 110, the edge 128 includes a plurality of linear sections or regions 132 separated by a corresponding number of peaks 130. In the spool 110, the number of linear sections 132 and peaks 130 is six (6), and hence the shape of the edge 128 when viewing the face 122 of the end wall 120 is a hexagon. It will be appreciated that the end wall 120 can be formed in other shapes, i.e. having a different number of linear edge sections and edge peaks.

The preferred spool 110 also comprises a second end wall 140. The end wall 140 defines an outer face 142 and an oppositely directed inner face 144. The second end wall 140 defines an edge 148 extending between the faces 142 and 144. The edge 148 preferably exhibits the same polysided configuration as the edge 128 of the first end wall 120. Thus, the edge 148 preferably includes six linear edge portions 152 and six peaks 150. Hence, the shape of the edge 148 when viewing the face 142 of the end wall 140 is a hexagon. However, the end wall 140 can be formed in other shapes, i.e. having a different number of linear edge sections and edge peaks.

The hub 160 of the preferred spool 110 extends between the end walls 120 and 140 and rigidly joins these members together. Preferably, the first and second end walls 120 and 140 are oriented parallel to one another, yet spaced from one another by the hub 160. Preferably, the hub has a cylindrical shape. The hub defines an outer surface 162 which preferably defines a circumferential surface between at least a majority of the surface area extending between the inner face 124 of the first end wall and the inner face 144 of the second end wall 140. The hub 160 also preferably defines a recess or indentation 164 extending around the hub 160. Preferably the recess 164 is proximate to, and most preferably immediately adjacent to the inner face 124 of the first end wall 120. In certain embodiments, it may be desirable to form the outer surface 162 of the hub 160 such that the outer surface is relatively smooth and free of any deep grooves, other than the recess 164. Alternately, it may be desirable to form one or more helical grooves around the outer surface 162 of the hub. Such helical grooves could serve to promote helical winding of the biasing member about the hub. In certain embodiments, it may be desirable to apply a high friction outer layer or coating upon the outer surface 162 of the hub 160. Providing such a surface promotes frictional engagement between the biasing member, e.g. spring, during and after winding about the hub. It is also contemplated to form the outer surface 162 of the hub 160 so as to exhibit a relatively high degree of friction or roughness.

The first end wall 120, the hub 160, and the second end wall 140 preferably define a passage 170 extending therethrough. Preferably, the passage 170 extends between the outer face 122 of the first end wall 120 and the outer face 142 of the second end wall 140. Preferably, the center of the passage 170 is collinear with the longitudinal axis L of the spool 110. The passage 170 is preferably sized and configured to receive the previously noted axle 190. In the event that the axle 190 is in the form of a threaded member, it is preferred that the passage 170 is free from any threads and that the threaded member is loosely received therein such that the spool can be freely rotated about the threaded member without engagement thereto.

Figure 8:
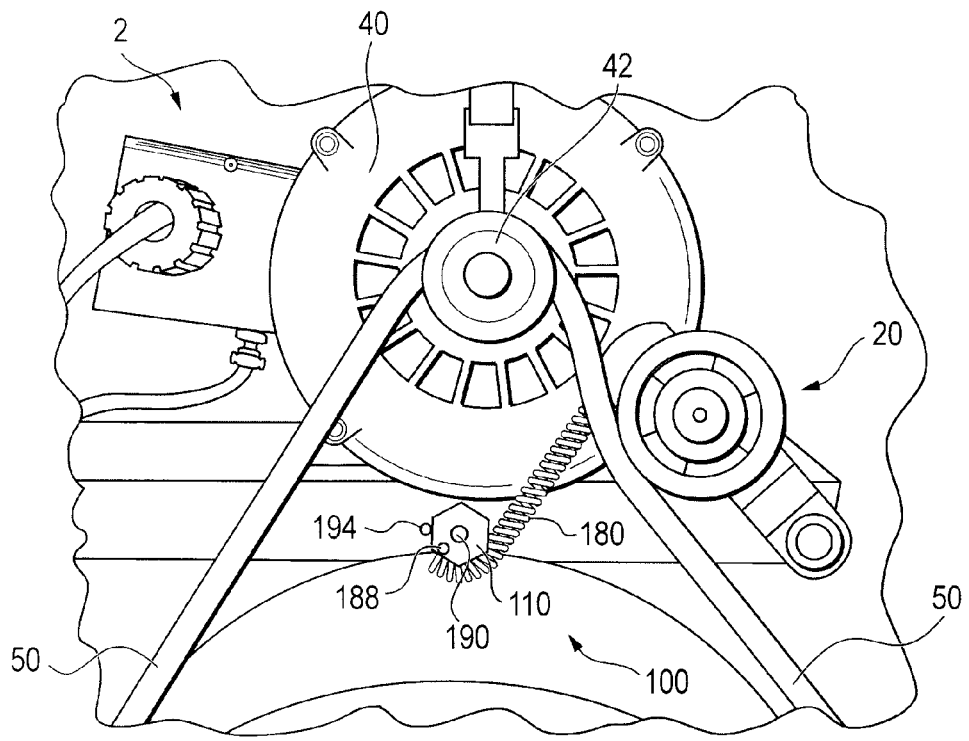
FIG. 8 is an illustration of the preferred embodiment variable belt tensioner assembly used in a drain cleaning device.

FIG. 8 illustrates the preferred embodiment belt tensioning assembly 100 incorporated in a drain cleaning apparatus 2. The assembly 100 comprises the spool 110 rotatably affixed to a support member of the apparatus 2 by use of an axle 190. A biasing member or spring 180 extends between the spool 110 and an idler pulley assembly 20. One end of the spring 180 is engaged to the spool 110 by an attachment member 188 that is engaged with or otherwise disposed in the aperture 126 defined in the end wall 120 of the spool 110. It is also contemplated that an end of the spring 180 or biasing member could be directly disposed in the aperture 126.

The force applied to the idler pulley assembly 20 by the spring 180 can be varied by selectively rotating the spool 110 about the axle 190. Rotation of the spool 110 in a clockwise direction displaces the member 188 about an arc also centered about the axle 190. By attaching the end of the spring 180 to the member 188, the end of the spring 180 is also displaced. Thus, upon clockwise rotation of the spool 110 shown in FIG. 8, the length of the spring 180 is increased thereby increasing the tensile force applied to the pulley 20. By reducing the length of the spring 180, such as by rotating the spool 110 in a counter-clockwise direction, the tensile force applied to the pulley 20 is reduced. It will be appreciated that placement of the spring 180 relative to the spool 110 can reverse the rotational directions for increasing or decreasing the tension applied to the belt. For example, referring to FIG. 8, if the spring 180 is positioned about an upper region of the spool 110 rather than a lower region as shown in the figure, in order to increase the tension of the spring, the spool 110 would be rotated counter-clockwise.

The configuration of the spool 110 promotes winding of the spring about the spool, and preferably about the hub 160 and most preferably, about the hub 160 and between the inner faces of the end walls 120 and 140. Thus, the preferred spool 110 enables a wide range of variation in the tension applied by a spring, particularly if the spring is relatively long, by enabling portions of the spring to be wound about the hub 160, while the end walls 120 and 140 prevent the spring from leaving its wound arrangement. The recess 164 shown in FIG. 7 serves to receive and frictionally engage a spring wound about or at least contacting the hub.

Upon achieving a desirable level of torque, an operator may secure the rotational position of the spool 110 relative to its stationary support, by tightening an engagement assembly that serves to retain or otherwise hold the selected rotational position of the spool with regard to the support. Such engagement assembly may be in a variety of forms such as utilizing a threaded member for axle 190 which is threadedly engaged by a support member underlying the spool 110, and by tightening the threaded member to thereby secure the spool 110 in its desired position against the support member. Another preferred assembly for securing the rotational position of the spool 110 is to utilize a blocking member 194 that is engaged to the support member, and which is positioned alongside and preferably, in contact with the spool 110. Most preferably, such placement of the blocking member 194 against a linear edge portion of the spool, such as shown in FIG. 8, serves to effectively prevent rotation of the spool 110 and thereby prevent accidental, unintended, or otherwise loss of desired tension levels in the belt. The use of a blocking member can be in combination with one or more other techniques for securing the spool to its underlying support or frame.

Figure 9:
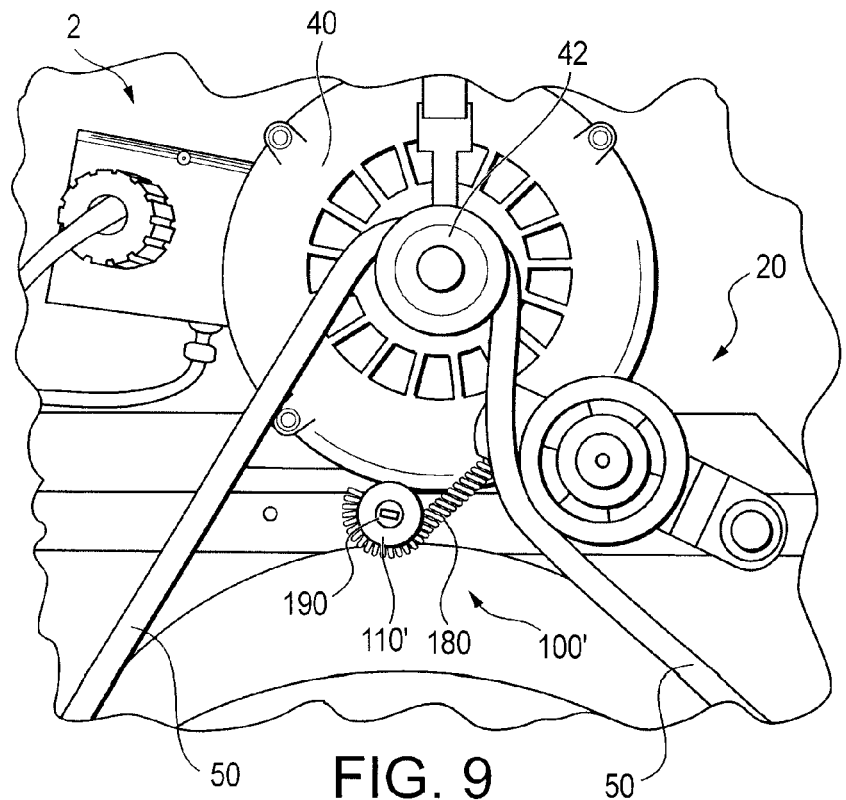
FIG. 9 is an illustration of another preferred embodiment variable belt tensioner assembly used in a drain cleaning device in accordance with the present invention.

FIG. 9 illustrates another preferred embodiment belt tensioning assembly 100' used in a drain cleaning apparatus 2. The assembly 100' comprises a spool 110' rotatably affixed to a support member of the apparatus 2 by use of the previously noted axle 190. As previously described with regard to the preferred assembly 100, the preferred assembly 100' comprises a biasing member or spring 180 extending between the spool 110' and an idler pulley assembly 20. One end of the spring 180 is engaged to the spool 110'. The previously described attachment member 188 shown in FIG. 8 could be used to engage an end of the spring 180 to the spool 110'.

Spool 110' differs from the previously described spool 110 by the configuration of the spool 110'. Instead of utilizing a polysided shaped spool, as with the spool 110, the spool 110' exhibits a round shape. It will be appreciated that the present invention may use a spool or spool-like member of nearly any shape.

Generally, nearly any type of biasing member can be used in the preferred embodiment tensioner assembly. One or more springs are preferred for use as the biasing member. A variety of spring types can be used such as tension or extension springs, and/or torsional springs. The selected spring(s) are preferably formed from steel, however the invention includes the use of different metals and non-metals for the biasing member.

For example, the biasing member can be formed from an array of non-metallic materials such as rubbers, polymeric materials, compound materials, or the like. It is preferred that the material exhibit elastic properties that are stable and constant. It is also preferred that the materials be durable and resistant to a range of environmental conditions.

It is also contemplated that one or more visible indicia or marks could be applied or otherwise formed on the spool and/or the frame member(s) in proximity to the spool to provide visual indication as to the rotational position of the spool. For example, one or more lines or marks could be applied onto the exposed end wall of a spool, and a collection of marks also applied onto the frame region surrounding the spool. The rotational position of the spool or change in such position could then be readily assessed by visual inspection by comparing the positions of the mark on the spool to the marks on the frame. Preferably, a plate or dial face could be provided on the frame member. A preferred dial could for example, include 10 to 20 different markings, each denoting a different arcuate position. It is also contemplated that various positional indicator markings be provided in conjunction with corresponding tension values of the biasing member and/or the belt, and/or the resulting torque levels as measured at the snake as a result of such tension.

Many other benefits will no doubt become apparent from future application and development of this technology.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A drain cleaning device comprising:
   a frame;
   a motor and drive pulley, the motor secured to the frame and adapted for poweredly rotating the drive pulley about a first axis;
   a rotatable drum rotatably secured to the frame, the drum rotatable about a second axis generally parallel to the first axis, the drum adapted to receive and administer a drain cleaning cable;
   a belt extending between the drive pulley and the drum for rotating the drum upon rotation of the drive pulley;
   an idler pulley assembly including a support arm and a positionable idler pulley affixed to the support arm and in contact with the belt, the support arm engaged with the frame;
   a belt tensioning assembly including (i) a spool engaged with the frame, the spool being rotatable about a center axle and (ii) a biasing member having a first end affixed to the spool and a second end affixed to the support arm of the idler pulley assembly;
   wherein tension of the belt can be changed by rotating the spool about the axle and displacing the first end of the biasing member through an arc also about the axle, such that the effective length of the biasing member is changed thereby resulting in the force applied to the support arm by the biasing member also being changed.

2. The drain cleaning device of claim 1 wherein the spool includes:
   a first end wall;
   a second end wall; and
   a hub extending between the first end wall and the second end wall,
   the spool further defining a passage extending through the first end wall, the second end wall, and the hub, the passage sized and shaped to receive the axle.

3. The drain cleaning device of claim 2 wherein the first end of the biasing member is attached to the first end wall of the spool.

4. The drain cleaning device of claim 2 wherein the first end wall and the second end wall of the spool each have a circular shape.

5. The drain cleaning device of claim 2 wherein the first end wall and the second end wall of the spool each have a polysided shape.

6. The drain cleaning device of claim 5 wherein each of the first end wall and the second end wall of the spool have a hexagon shape.

7. The drain cleaning device of claim 1 further comprising a selectively removable blocking member engaged to the frame and positioned adjacent to the spool such that rotation of the spool is precluded by the blocking member.

8. The drain cleaning device of claim 2 wherein the hub has a cylindrical shape and defines a recess extending along an outer surface of the hub.

9. The drain cleaning device of claim 1 wherein the biasing member is in the form of a spring.

10. The drain cleaning device of claim 9 wherein the spring is a coil spring.

11. A drain cleaning device comprising:
    a frame;
    a motor and drive pulley, the motor secured to the frame and adapted for poweredly rotating the drive pulley;
    a rotatable drum rotatably secured to the frame, the drum adapted to receive and administer a drain cleaning cable;
    a belt extending between the drive pulley and the drum for rotating the drum upon rotation of the drive pulley;
    an idler pulley assembly including a positionable support arm and an idler pulley rotatably attached to the support arm and in positionable contact with the belt, the support arm engaged with the frame;
    a belt tensioning assembly including (i) a spool rotatably mounted to the frame, the spool including a centrally disposed hub, and (ii) an elongate biasing member having a first end affixed to the spool, a second end affixed to the support arm of the idler pulley assembly, and an intermediate region defined between the first and second ends, wherein upon rotating the spool, at least a portion of the intermediate region of the biasing member contacts the hub of the spool.

12. The drain cleaning device of claim 11 wherein the spool further includes a first end wall and a second end wall between which the hub extends.

13. The drain cleaning device of claim 12 wherein at least one of the first and second end walls of the hub is polysided and includes a plurality of linear edge regions.

14. The drain cleaning device of claim 11 wherein the belt tensioning assembly further includes a removable blocking member selectively engaged with the frame adjacent the spool such that rotation of the spool depends upon the position of the blocking member relative to the spool.

15. A drain cleaning device comprising:
    a frame;
    a motor and drive pulley, the motor secured to the frame and adapted for poweredly rotating the drive pulley;
    a rotatable drum rotatably secured to the frame, the drum adapted to receive and administer a drain cleaning cable;
    a belt extending between the drive pulley and the drum for rotating the drum upon rotation of the drive pulley;
    an idler pulley assembly including a support arm and a positionable idler pulley rotatably attached to the support arm and in positionable contact with the belt, the support arm engaged with the frame;
    an assembly for adjusting tension of the belt applied by the idler pulley, the assembly comprising (i) a rotatable spool including a cylindrical hub extending between a pair of end walls, the spool defining a passage extending through the hub and the pair of end walls, the spool movably engaged to the frame by an axle member, and (ii) an elongate biasing member having a first end, a second end, and an intermediate portion extending between the first and the second ends, the first end being affixed to one of the end walls of the spool, the second end being affixed to the support arm of the idler pulley assembly, the elongate biasing member exerting a tension force on the support arm.

16. The drain cleaning device of claim 15 wherein the elongate biasing member is a spring.

17. The drain cleaning device of claim 16 wherein the spring is a coil spring.

18. The drain cleaning device of claim 15 wherein at least a portion of the intermediate portion of the biasing member is in contact with the hub of the spool.

19. The drain cleaning device of claim 18 wherein the hub defines a recess and a portion of the intermediate portion of the elongate biasing member that is in contact with the hub, being disposed in the recess.

20. The drain cleaning device of claim 18 wherein the biasing member is formed from a non-metallic material.

* * * * *